(12) United States Patent
Tanimoto (10) Patent No.: US 6,963,419 B2
(45) Date of Patent: Nov. 8, 2005

(54) FACSIMILE APPARATUS AND FACSIMILE COMMUNICATION METHOD

(75) Inventor: Yoshifumi Tanimoto, Uji (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 843 days.

(21) Appl. No.: 09/931,675

(22) Filed: Aug. 15, 2001

(65) Prior Publication Data

US 2002/0024684 A1   Feb. 28, 2002

(30) Foreign Application Priority Data

Aug. 25, 2000  (JP) .............................. 2000-256261

(51) Int. Cl.$^7$ .......................... G06F 15/00; H04N 1/00; H04N 1/40; H04N 1/44
(52) U.S. Cl. .................... 358/1.15; 358/400; 358/443; 380/243
(58) Field of Search .............................. 358/1.15, 468, 358/434–436, 402–403, 440, 400, 407, 438–439; 380/243, 245

(56) References Cited

U.S. PATENT DOCUMENTS 5,757,911 A * 5/1998 Shibata ....................... 380/243
5,909,289 A * 6/1999 Shibata et al. ............... 358/468

FOREIGN PATENT DOCUMENTS

| JP | 08-331394 | 12/1996 |
| JP | 09-116728 | 5/1997 |
| JP | 09-284521 | 10/1997 |
| JP | 10-070643 | 3/1998 |
| JP | 10-190903 | 7/1998 |
| JP | 11-252343 | 9/1999 |
| JP | 2000-174969 | 6/2000 |
| JP | 2001-211306 | 8/2001 |
| WO | 97/09817 | 3/1997 |

* cited by examiner

Primary Examiner—Kimberly Williams
Assistant Examiner—Charlotte M. Baker
(74) Attorney, Agent, or Firm—Hogan & Hartson, LLP (57) ABSTRACT

A facsimile server carries out facsimile communication, and notifies a forwarding destination computer of the confidential data reception when the facsimile server has confidentially received communication data. The facsimile apparatus transmits the confidentially received data in accordance with a demand by the destination computer. The facsimile server encrypts and decrypts the received data by using an encryption key produced based on peculiar information of the facsimile server and the forwarding destination computer at the time of carrying out communication with the destination computer via a computer network.

19 Claims, 10 Drawing Sheets

FACSIMILE APPARATUS AND FACSIMILE COMMUNICATION METHOD

CROSS REFERENCES TO RELATED APPLICATIONS

This application claims priority under 35 USC 119 of Japanese Patent Application No. 2000-256261 filed in JPO on Aug. 25, 2000, the entire disclosure of which is incorporated herein by reference.

BACKGROUND OF THE INVENTION

1. Field of the Invention

The present invention relates to a facsimile apparatus and a facsimile communication method employing a function, in which a typical facsimile communication via the PSTN (Public Switched Telephone Network) is carried out, and also relates to a facsimile apparatus connected to the other computer via the computer network and a facsimile communication method.

2. Description of the Related Art

Recently, the facsimile apparatus, which is capable of being connected to the computer network such as a LAN (Local Area Network), and functions as a facsimile server of other computers connected to the computer network in the same way, has been developed. This is a facsimile apparatus which possesses the typical facsimile transmission and reception function via the general telephone line network, and which is capable of transmitting an original (a document, for example) by a facsimile with an instruction from the other computer connected to the computer network, and sending the information received by the facsimile to the other computer via the computer network.

In the past, the facsimile apparatus was often placed within the user's daily life activity area (inside the office where the user works, for example). This was because there was a need to set the document directly on the facsimile apparatus when sending the document, and to recognize the arrival of a facsimile message as soon as possible. However, as in the facsimile apparatus connected to the computer network, the user is able to generate a transmission command from the computer at hand, and even when there is a reception of message, it is transmitted to the user's computer at hand, and therefore it is not necessary for the facsimile apparatus to be placed within the user's daily life activity area.

A conventional facsimile apparatus has a confidential reception function which temporarily stores received information, which prints a list notifying of the confidential reception, and which prints the stored information when a designated pass code is input. Among facsimile apparatuses functioning as the facsimile server as described above, there is a facsimile apparatus including a confidential reception function. This facsimile apparatus makes it possible to generate commands to notify, by electronic mail, a destination computer that there is a confidential reception of the information stored temporarily. A user who reads the notifying electronic mail commands the information to be printed, or to be transmitted to his mail box. The user is able to set up the facsimile apparatus to automatically transmit electronic mail, to perform transmission each time there is a confidential reception, to perform transmission when several messages are accumulated, and to perform transmission when the prescribed time has arrived.

In the typical facsimile communication via the general telephone line network, the privacy is protected. However, in the computer network such as a LAN, the privacy is not protected, and there is a risk for even the confidentially received information to be stolen by the third party during transmission to the destination computer through the computer network. There is also a risk that the communication message having secret information exchanged with the destination computer is stolen.

SUMMARY OF THE INVENTION

With the foregoing in view, it is an object of the present invention to provide a facsimile apparatus which is capable of protecting the privacy when transmitting the information received confidentially by the facsimile communication to the destination computer.

According to one aspect of the present invention, a facsimile apparatus performs encryption and decryption by an encryption key based on the peculiar information of self and the other communication side, communicates with a computer via the network, and carries out facsimile communication by an instruction from the computer. The facsimile apparatus includes notifying means for giving a notice of the confidential reception to the computer which is to carry out confidential processing when there is a confidential reception and transmitting means for transmitting the content of confidential reception in accordance with the demand from the computer.

This facsimile apparatus carries out encryption and decryption by an encryption key based on each peculiar information of self and the other communication side and communicates with the computer via the network, and carries out facsimile communication by the instruction from the computer. Notifying means performs encryption and notifies the computer which carries out confidential processing when there is a confidential reception, and transmitting means performs encryption and transmits the content of the confidential reception by responding to the demand in encryption from the computer which is supposed to carry out the confidential processing.

Thus, it is possible to realize the facsimile communication capable of protecting privacy when transmitting to the destination computer the information confidentially received by the facsimile communication.

According to another aspect of the present invention, a facsimile apparatus performs encryption and decryption by the encryption key produced based on the peculiar information of self and the other communication side, communicates with the computer via the network, and carries out facsimile communication by the instruction from the computer. The facsimile apparatus includes transmitting means for transmitting the content of the confidential reception as an electronic mail to the computer which is supposed to carry out confidential processing when there is a confidential reception.

This facsimile apparatus performs encryption and decryption by an encryption key based on the peculiar information of self and the other communication side, communicates with the computer via the network, and carries out the facsimile communication by the instruction from the computer. The transmitting means encrypts the content of the confidential reception and transmits the content as electronic mail to the computer which is supposed to carry out confidential processing when there is a confidential reception.

Thus, it is possible to realize the facsimile communication capable of protecting the privacy when transmitting to the destination computer the information received confidentially by the facsimile communication.

According to another aspect of the present invention, the facsimile apparatus further includes selecting means for selecting the part to be encrypted by the encryption key from the above-mentioned content which is communicated to the computer which is supposed to carry out the confidential processing, and encrypts in accordance with the selection of this means.

This facsimile apparatus is constituted such that the selecting means selects the part to be encrypted by the encryption key from the content which is communicated to the computer which is supposed to carry out confidential processing and that encryption is carried out in accordance with the selection. Therefore, the level of privacy protection can be fixed according to the level of privacy protection of the computer network and the content of the information to be received confidentially.

Additional objects, aspects, benefits and advantages of the present invention will become apparent to those skilled in the art to which the present invention pertains from the subsequent detailed description and the appended claims, taken in conjunction with the accompanying drawings

DETAILED DESCRIPTION OF THE INVENTION

An embodiment of the present invention will now be described in reference to the accompanying drawings.

(Embodiment 1)

Figure 1:
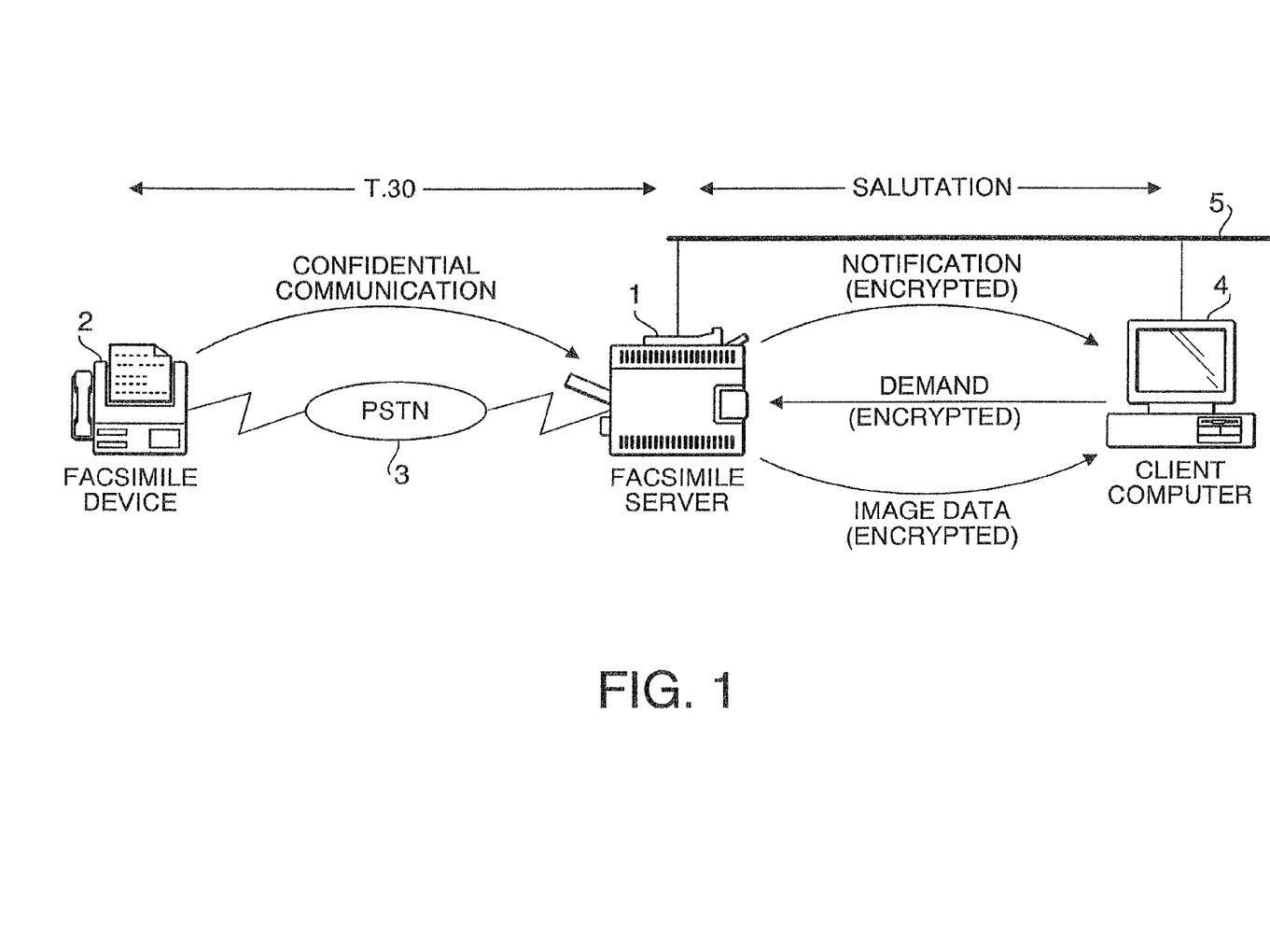
FIG. 1 is a schematic diagram showing the connection of a facsimile apparatus 1 to a computer network according to the present invention.

As shown in FIG. 1, the facsimile server 1 which is a facsimile apparatus according to the present invention is connected to the computer network LAN 5 (Local Area Network). The LAN 5 is connected to the client computer 4 which is another computer. The communication between the facsimile server 1 and the client computer 4 is carried out in the LAN 5 by the Salutation protocol.

The facsimile server 1 is also connected to an analog Public Switched Telephone Network (PSTN) 3, and functions as the server computer of the client computer 4 in the computer network connected by the LAN 5. More particularly, the facsimile server 1 includes functions to transmit the facsimile message (image data) to the PSTN 3 by responding to the demand from the client computer 4 and to send out the facsimile message received from the PSTN 3 to the client computer 4.

The facsimile server 1 operates in accordance with the recommendation ITU-T T.30 (a procedure for transmission of a document facsimile in the PSTN) in the PSTN 3.

The telephone line network in the embodiment is not limited to the typical PSTN, but may be the leased telephone line network, for example.

A plurality of facsimile apparatuses of which each has its own telephone number are connected to the PSTN 3 (in FIG. 1, only one apparatus is shown as the reference number 2).

In FIG. 1, only one client computer 4 is shown, but it would be sufficient that one client computer at the minimum is connected to the LAN 5. However, many client computers are connected to the LAN 5 in many cases.

Figure 2:
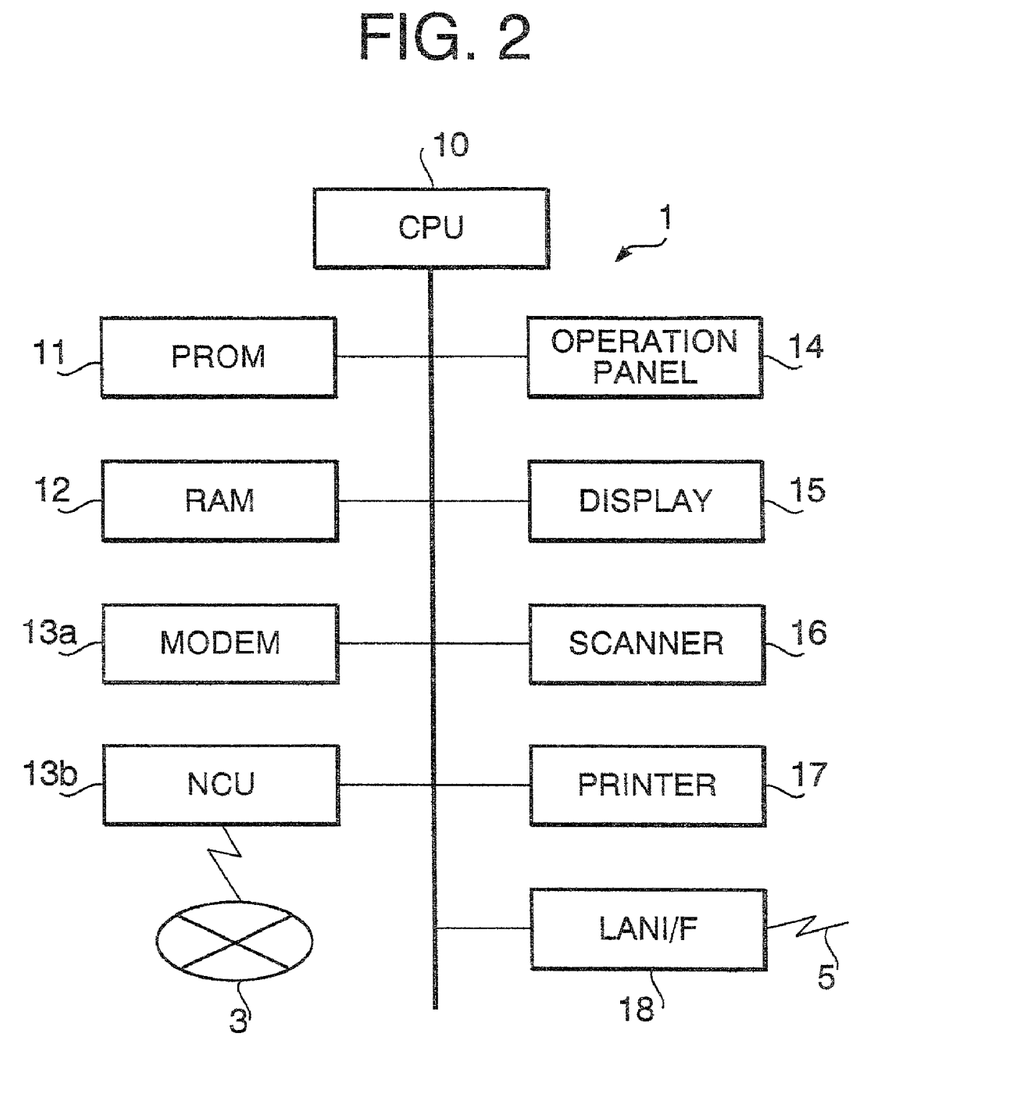
FIG. 2 is a block diagram showing the structure of the facsimile apparatus shown in FIG. 1.

As shown in FIG. 2, this facsimile server 1 includes CPU 10, PROM 11, RAM 12, a modem 13a, NCU 13b, an operation panel 14, a display 15, a scanner 16, a printer 17, LANI/F 18, and so on, which are connected to the CPU 10 via a bus.

PROM 11 stores various computer programs run by CPU 10. CPU 10 carries out various processing required for the facsimile server 1 to function, based on the computer program stored in PROM 11.

RAM 12 includes DRAM, SRAM, a flash memory and so forth, stores the temporary data which is generated when the computer program is executed by CPU 10, and also functions as an image memory.

RAM 12 stores the address (peculiar information) of the facsimile server 1, the input secret information and center public information distributed from the center. These information are necessary for the communication by such as the ID-NIKS (ID-based Non-Interactive Key Sharing Scheme) which is to be mentioned later on, so that the encryption/decryption can be carried out by the encryption key made based on each peculiar information of the facsimile server 1 and the other communication side (the client computer 4).

The modem 13a is constructed as the facsimile modem which is capable of carrying out a facsimile communication. The modem 13a is directly connected to NCU (Network Control Unit) 13b which is connected to the bus. NCU 13b is a hardware which closes and releases the circuit to the PSTN 3, and connects the modem 13a to PSTN 3 in accordance with a necessity. By employing the ISDN interface, the modem 13a may be connected to the Integrated Services Digital Network (ISDN).

The operation panel 14 includes various kinds of keys including the function keys such as a character key, a numeric key, a speed dial key, a one-touch dial key, and a conversation reservation key, required by the user to directly operate the facsimile server 1. The display 15 is constructed as the liquid crystal display (LCD), and displays the input result from the operation panel 14 and the operating condition of CPU 10 and so forth.

The display 15 may be CRT display, for example, and by constructing the operation panel 14 as the display apparatus using the touch panel method, it is also possible to use both this touch panel and several or all of the above-mentioned function keys of the operation panel.

The scanner 16 reads, as an image, the content of the original by using the color CCD and so forth, and outputs the dot image data (image data) which is converted into black and white binary or converted into color. The image data output from the scanner 16 is stored temporarily in RAM 12.

is converted into a facsimile data, and then is output to PSTN 3 via the modem 13a, or is output to the LAN 5 via LANI/F 18.

The printer 17 is constructed as a printing apparatus employing an electro-photographic method or the like, and prints the content read by the scanner 16, the image data received by facsimile (image data), various kinds of messages output by CPU 10, and so forth. LANI/F 18 is an interface for connecting the facsimile server 1 to the LAN 5.

According to the facsimile apparatus of the embodiment 1 of the present invention, the facsimile server 1 basically includes the hardware structure as in the above description, and also includes a function as a typical facsimile server. However, when there is another confidential reception, the facsimile server 1 communicates with the client computer 4 by the encryption and decryption of ID-NIKS, for instance.

ID-NIKS is an encrypting system which makes use of the ID (Identity) information specifying the address and the name of each entity (substance; a person, a computer, a facsimile server, and so forth). In this encrypting system, the common encryption key is produced between the transmitter and the receiver based on the ID information. However, since a preliminary communication is not necessary, it is very convenient.

ID-NIKS is a system in which the encryption key is shared without carrying out the preliminary communication based on ID information of the other communication side, and also a system in which there is no need for the public key and the secret key to be exchanged between the transmitter and the receiver, and the list of keys and the service by the third party are not needed. The communication can be carried out safely between any entities. The DES (Data Encryption Standard) or the like may be used for the encrypting system.

Figure 3:
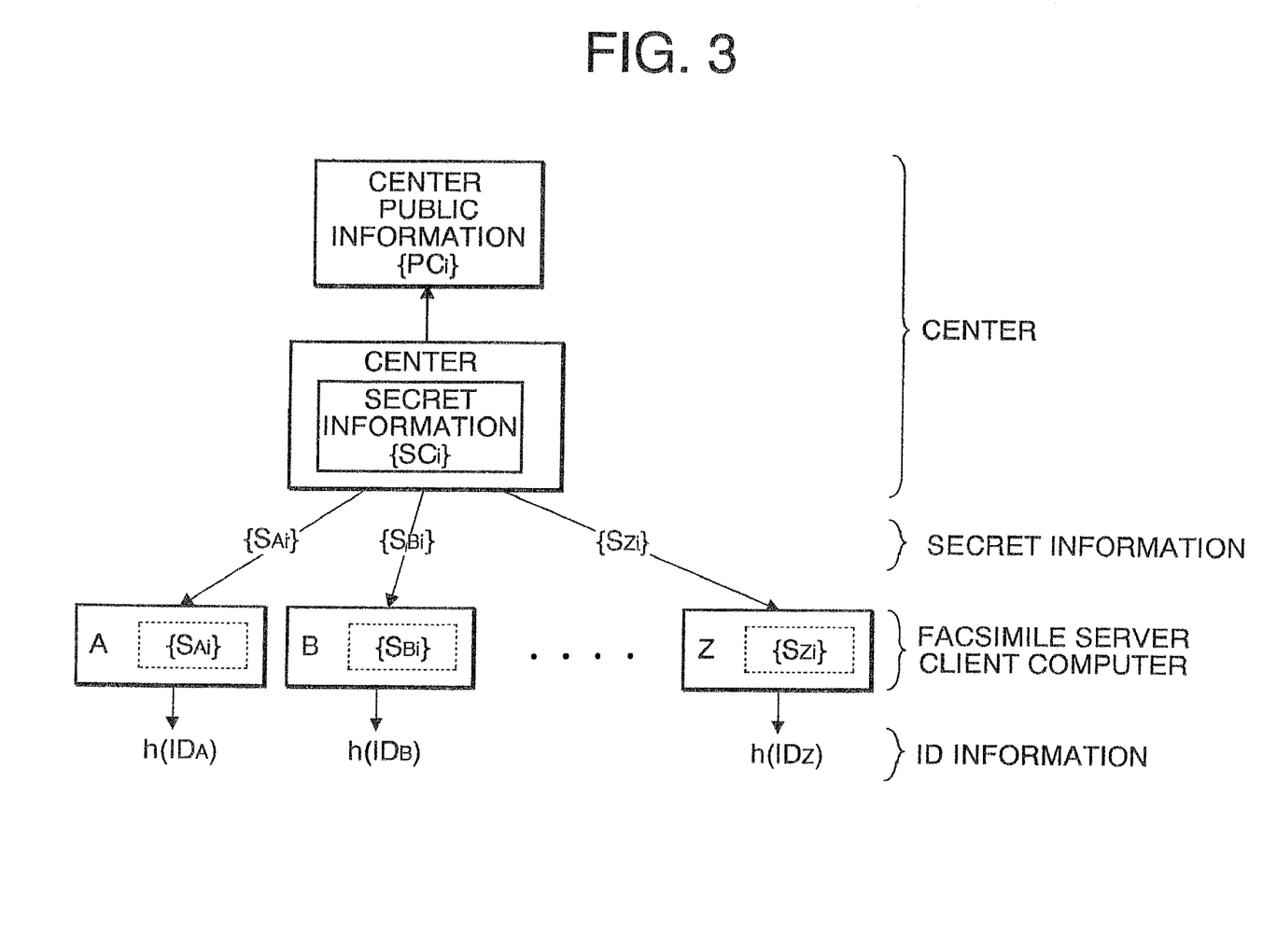
FIG. 3 is an illustration describing the principle of the ID-NIKS system.

As shown in FIG. 3, there exists a trustworthy center, and a common key producing system is formed with this center as the central part. The ID information such as the name, the address, the telephone number of the entity X are shown as h (IDx) by using the hash function h(•). Based on the center public information {PCi}, the center secret information {SCi}, and the ID information h (IDx) of the entity X, the center calculates, for the arbitrarily selected entity X, the secret information Sxi as in the following equation and distributes Sxi to the entity X in secrecy.

$Sxi = Fi(\{SCi\}, \{PCi\}, h(IDx))$

The entity X produces, between the entity X and another arbitrarily selected entity Y, the common key KXY for encrypting and decrypting as in the following equation by using the secret information {Sxi} of the entity X itself, the center public information {PCi}, and the ID information h (IDy) of the other communication side entity Y.

$KXY = f(\{Sxi\}, \{PCi\}, h(IDy))$

The entity Y also produces a key to the entity X as the common key KYX in the same manner. If the relationship of KXY=KYX is established at all times, the keys KXY and KYX may be used as an encryption key and a decryption key between the entities X and Y.

In the RSA encrypting system which is the public key encrypting system, the length of the public key is ten and several times that of the current telephone number and is very complicated. On the other hand, in ID-NIKS, by entering each ID information in a register format, the common key between any entities may be produced by referring to this register.

The facsimile server 1 and the client computer 4 store the confidential information Sxi. The confidential information Sxi is calculated and distributed in secrecy beforehand, based on the center public information {PCi}, the center secret information {SCi}, and the ID information h (IDx) which is each address on the LAN 5. In the present embodiment, the user ID of the Salutation Protocol may be used as the address.

Regarding the communication in the LAN 5, the facsimile server 1 and the client computer 4 produce the common key KXY for encrypting and decrypting as in the following equation between the self and the other communication side, by using own secret information {Sxi}, the center public information {PCi} and the ID information h (IDy) of the other side.

$KXY = f(\{Sxi\}, \{PCi\}, h(IDy))$

The operation of the facsimile server 1 having this structure will now be described referring to the corresponding flow chart.

Figure 4:
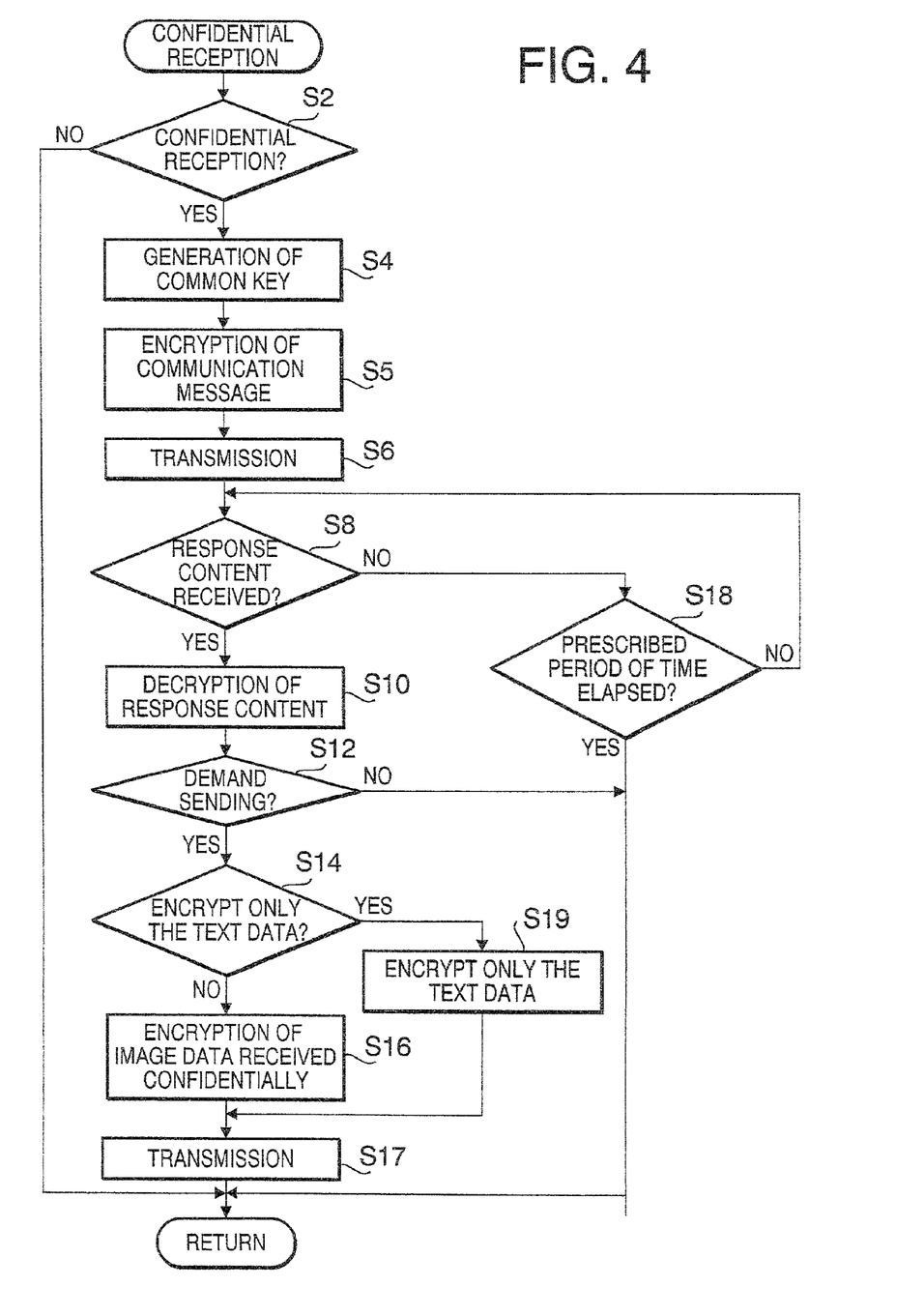
FIG. 4 is a flow chart showing the operation of the facsimile apparatus 1 shown in FIG. 1.
Figure 5:
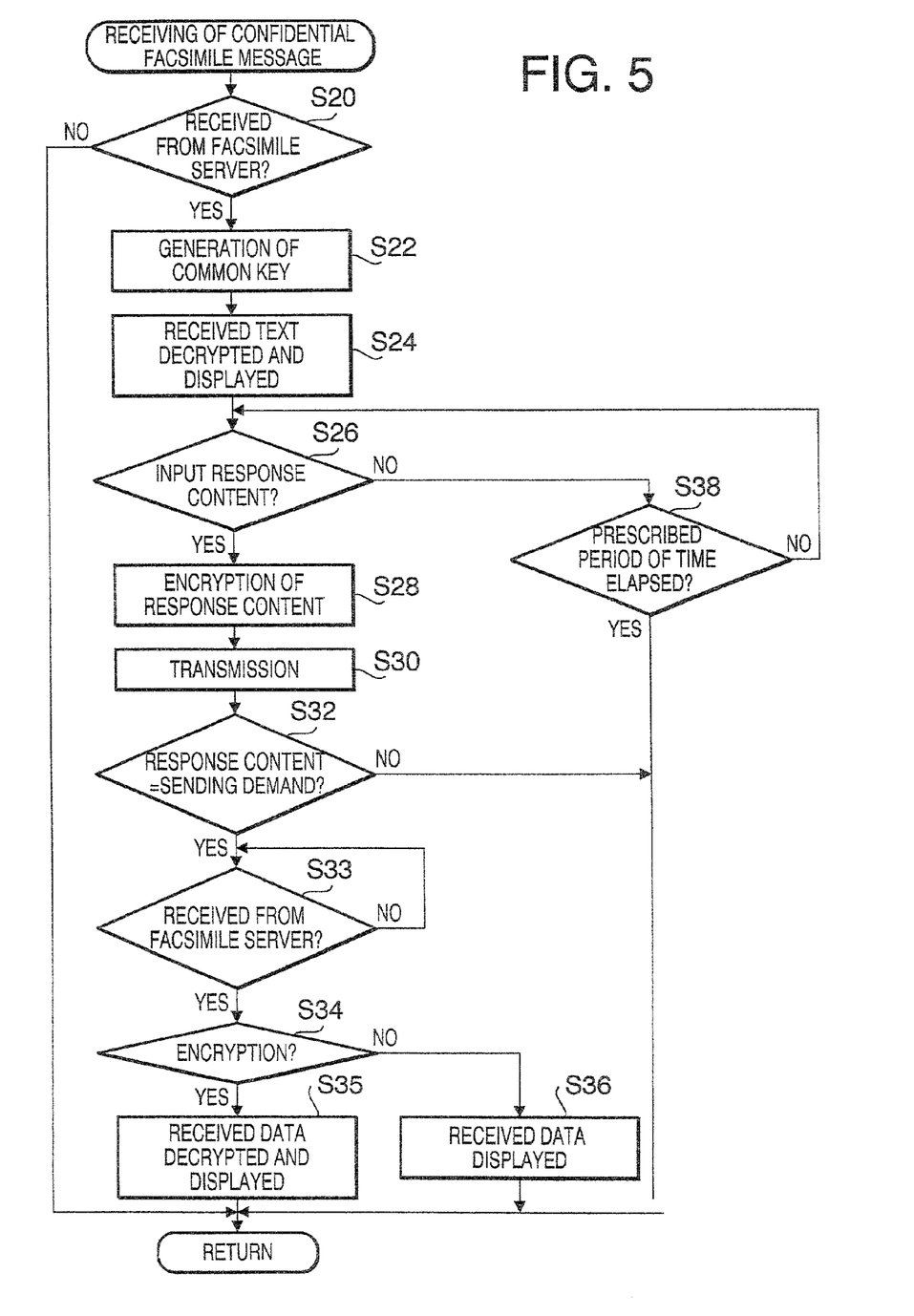
FIG. 5 is a flow chart showing the operation of a client computer 4 shown in FIG. 1.

FIG. 4 is a flow chart showing the operation of the facsimile server 1 when there is a confidential reception. FIG. 5 is a flow chart showing the operation of the client computer 4 at this time.

When the facsimile server 1 confidentially receives, via PSTN from the facsimile device 2 (FIG. 4 S2), the encrypting and decrypting common key is produced (S4) by using own secret information, the center public information, and the address of the client computer 4 on the LAN 5 which is the destination of the confidential reception and is supposed to carry out confidential processing.

Next, the facsimile server 1 encrypts (S5) the communication message by the made common key (S4) to notify the client computer 4 of the confidential reception and transmits (S6) the encrypted communication message to the client computer 4 via the LAN 5.

When the client computer 4 receives from the facsimile server 1 via the LAN 5 (FIG. 5, S20), the client computer 4 produces the common key (S22) for encryption and decryption by using own secret information, the center public information, and the address of the facsimile server 1 on the LAN 5 which is the transmitting side of the received information.

Next, the client computer 4 decrypts the received information by the made common key (S22) and displays (S24) the received information (S20).

When the response content is input by the user (S26) with the received and decrypted information (S20) being displayed (S24), the client computer 4 encrypts (S28) the response content by the made common key (S22), and transmits the encrypted response content to the facsimile server 1 via the LAN5 (S30).

When the response content is not input by the user (S26) with the received and decrypted information (S20) being displayed (S24) and the prescribed period of time has elapsed (S38), the process of the client computer 4 returns.

When the facsimile server 1 receives the response content from the client computer 4 via the LAN 5 (FIG. 4, S8), the facsimile server 1 decrypts (S10) the response content by the made common key (S4).

When the decrypted response content (S10) shows the demand (S12) for the sending of the confidentially received image data (S2), and only the text data part is set to be encrypted (S14), the facsimile server 1 encrypts (S19) only the text data such as the name of the transmitter and the transmitted time attached to the confidentially received image data (S2), and transmits (S17) the text data to the client computer 4 with the image data and then the process returns.

The process of the facsimile server 1 returns when the prescribed period of time has elapsed without receiving response content from the client computer 4 via the LAN 5.

When the part to be encrypted is not selected specifically (S14), the facsimile server 1 encrypts (S16), by the made common key (S4), the confidentially received image data (S2) and the attached text data such as the name of the transmitter and the transmitted time, and transmits the data to the client computer 4 (S17), and the process returns. At the time of transmitting the data, Salutation Protocol may be utilized.

The process of the facsimile server 1 returns (S12) when the decrypted response content (S10) does not show the demand (S12) for the sending of the confidentially received image data (S2).

The process of the client computer 4 returns when the response content (FIG. 5 S30) transmitted to the facsimile server 1 via the LAN 5 does not show the demand (FIG. 5, S32) for the sending of the confidentially received image data (FIG. 4, S2). The client computer 4 stands by (S33) to receive from the facsimile server 1 when the response content shows the sending demand (S32).

When the client computer 4 receives from the facsimile server 1 (S33), and the received data is encrypted (S34), the received data is decrypted by the made common key (S22), is converted into an image, and is displayed (S35). Then the process of the client computer 4 returns. When the received data is not encrypted (S34), the received data is converted into an image without being decrypted, and is displayed (S36). Then the process of the client computer 4 returns.

The process may use the pass code as follows. When demanding the sending from the client computer 4, the pass code is also input and transmitted, the accuracy of the pass code is checked at the facsimile server 1, and when the pass code is correct, the image data is transmitted.

(Embodiment 2)

Figure 6:
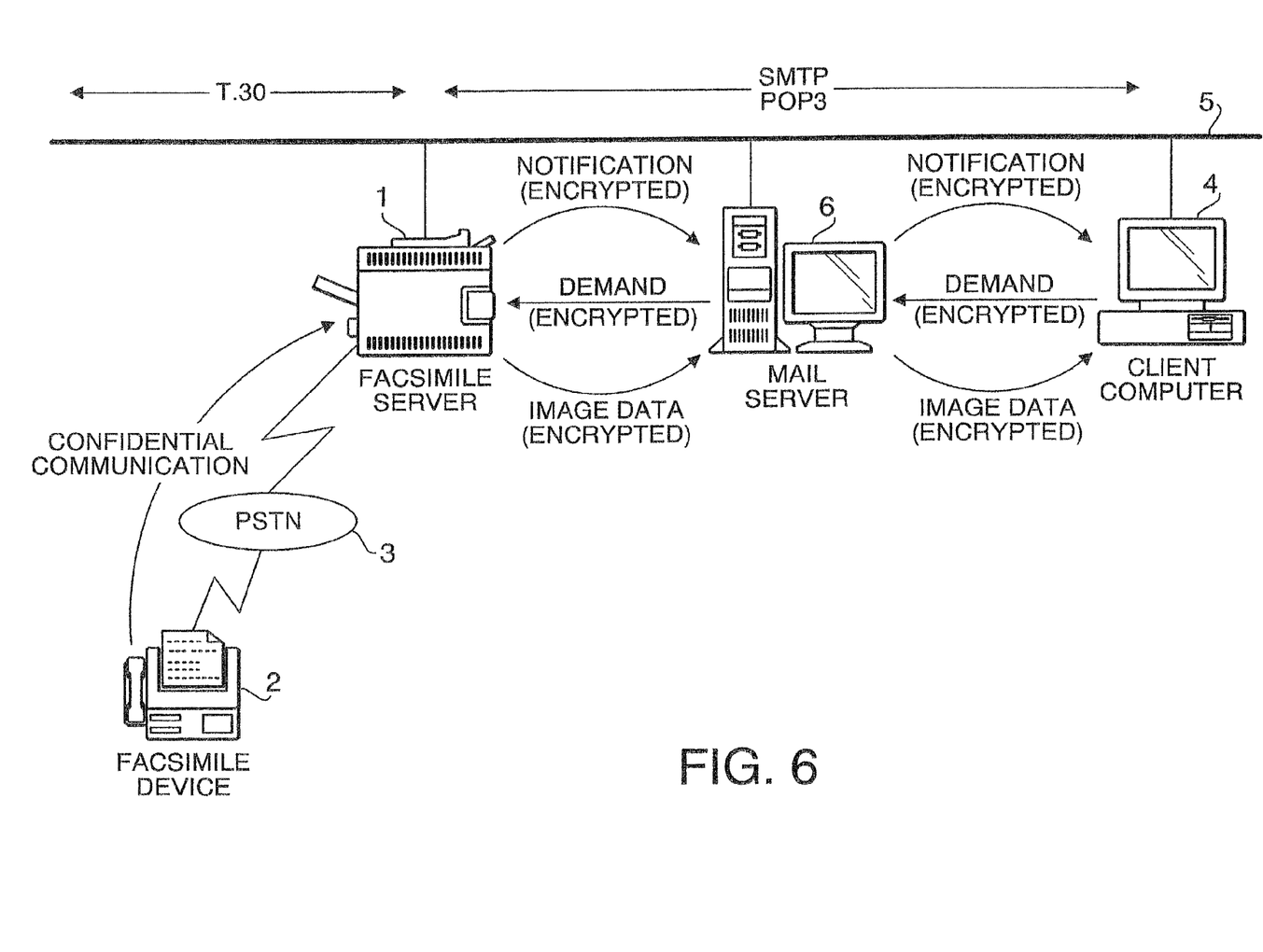
FIG. 6 is another schematic diagram showing the connection of the facsimile apparatus 1 of FIG. 2 to the computer.

FIG. 6 is a schematic diagram showing the connection of the facsimile apparatus to the computer network according to the embodiment 2 of the present invention. The facsimile server 1 which is the facsimile apparatus according to the embodiment of the present invention is connected to the LAN 5 (Local Area Network) which is a computer network. The client computer 4 which is another computer, and the mail server 6 which mediates the electronic mail transmitted and received within the LAN 5 are connected to the LAN 5.

In the LAN 5, the image data of the facsimile server 1 is transmitted and received as an attached file of the electronic mail by the SMTP (Simple Mail Transfer Protocol) and POP 3 (Post Office Protocol ver.3) for transmission and reception of the electronic mail.

The facsimile server 1 is also connected to the analog public switched telephone network (PSTN) 3, and functions as a server computer of the client computer 4 in the computer network connected by the LAN 5. More particularly, the facsimile server 1 includes at least functions which transmit the facsimile message (image data) to PSTN 3 according to the demand in the electronic mail from the client computer 4, and which send the facsimile message received from PSTN 3 as an electronic mail to the client computer 4.

The facsimile server 1 operates in accordance with the recommendation ITU-T T.30 in PSTN 3.

The telephone line network in the embodiment is not to be limited to the PSTN, but a leased telephone line network may be applied.

A plurality of the facsimile apparatuses of which each has its own telephone number is connected to the PSTN 3 (in FIG. 6, only one apparatus is shown with the reference number 2).

In FIG. 6, only one client computer 4 is shown, but it is sufficient that one computer at the minimum is connected to the LAN 5. However, many client computers are connected to the LAN 5 in many cases.

Since the structure of the facsimile server 1 which is the facsimile apparatus according to the embodiment 2 of the present invention is the same as the block diagram of FIG. 2, its description will be omitted.

The facsimile server 1 as the facsimile apparatus according to the embodiment 2 of the present invention has a function as a typical facsimile server, but moreover when there is confidential reception, the facsimile server 1 communicates with the client computer 4 by the encryption and decryption of ID-NIKS, for instance. The description on ID-NIKS is omitted as it has been described already (in FIG. 3).

The facsimile server 1 and the client computer 4 store the secret information Sxi. The secret information Sxi is calculated and distributed in secrecy beforehand based on the center public information {PCi}, the center secret information {SCi}, and the ID information h (IDx) which is each address on the LAN 5. According to this embodiment, the electronic mail address may be used as the address.

Regarding communication in the LAN 5, the facsimile server 1 and the client computer 4 produces the common key KXY for encrypting and decrypting between the self and the other communication side by using own secret information {Sxi}, the center public information {PCi} and the ID information h (IDy) of the other side as in the following equation.

$$KXY = f(\{Sxi\}, \{PCi\}, h(IDy))$$

The operation of the facsimile server 1 with the above-mentioned structure will now be described referring to the corresponding flow charts.

Figure 7:
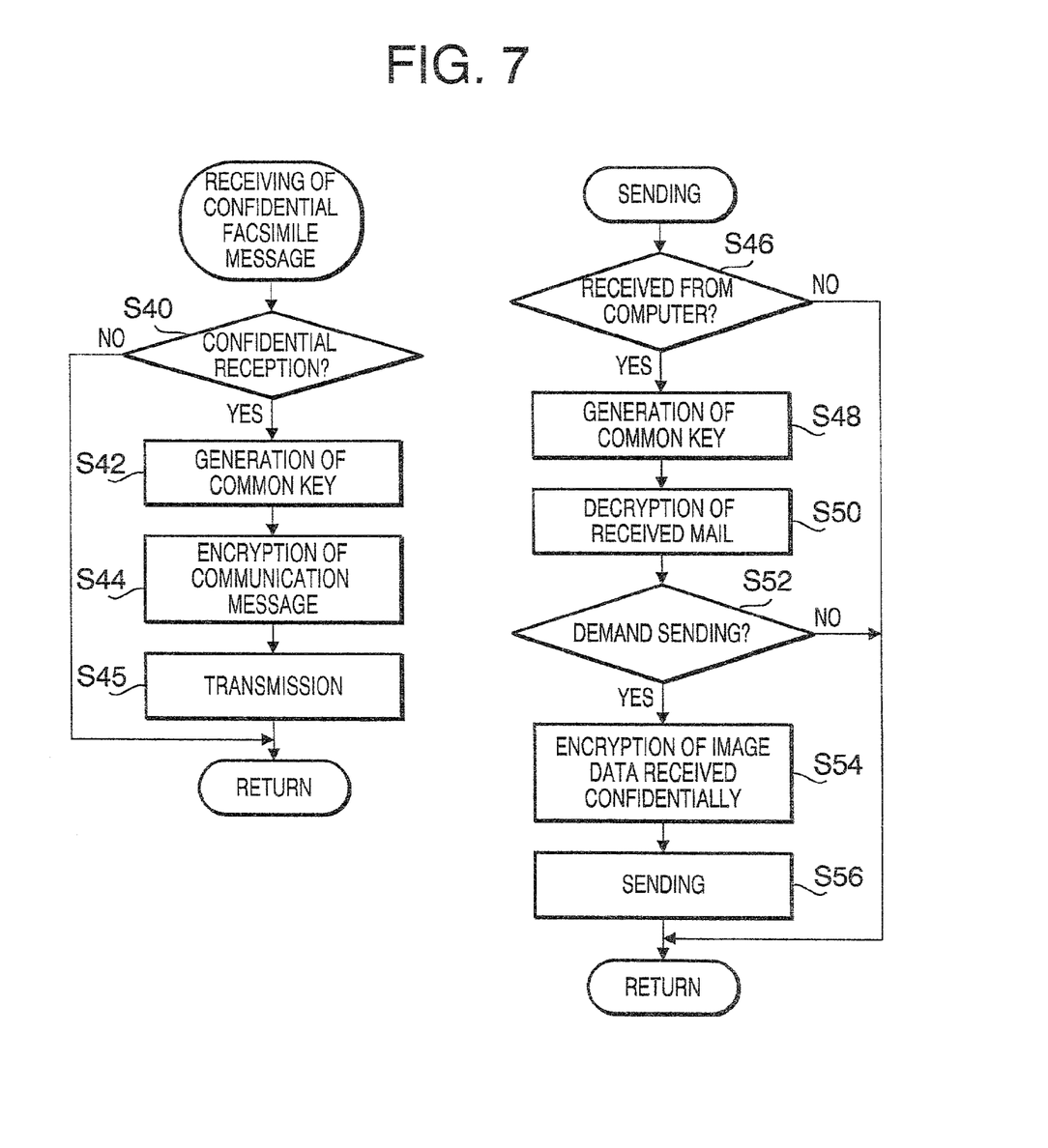
FIG. 7 is another flow chart showing the operation of the facsimile apparatus 1 shown in FIG. 6.
Figure 8:
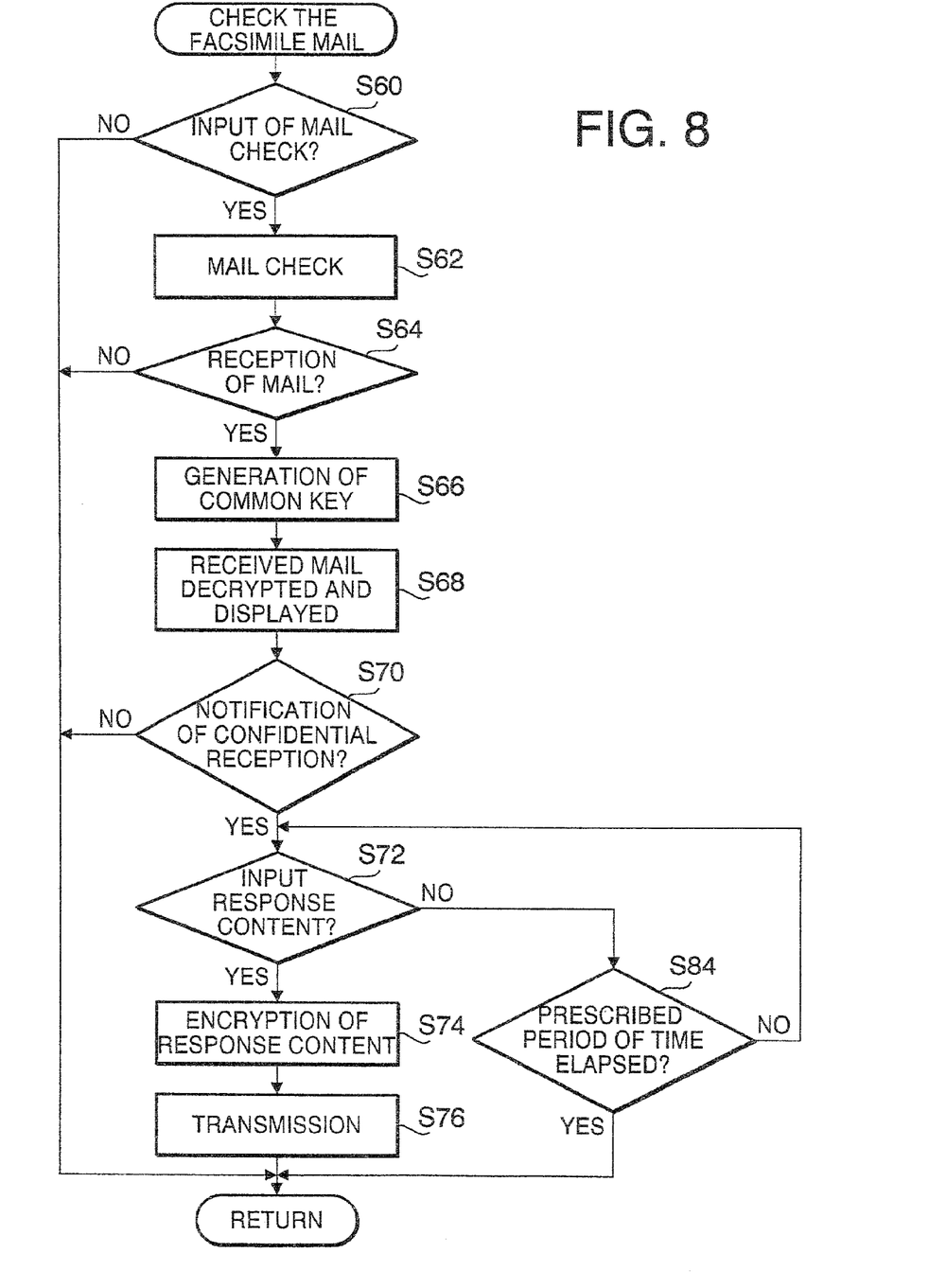
FIG. 8 is another flow chart showing the operation of the client computer 4 shown in FIG. 6.

FIG. 7 is a flow chart showing the operation of the facsimile server 1 when there is a confidential reception. FIG. 8 is a flow chart showing the operation of a client computer 4 at this time.

When the facsimile server 1 confidentially receives, via PSTN from the facsimile device 2 (FIG. 7, S40), the facsimile server 1 produces the encrypting and decrypting common key (S42) by using own secret information, the center public information, and the address of the client computer 4 on the LAN 5 which is the destination of the confidential reception.

Next, the facsimile server 1 encrypts (S44) the communication message by the made common key (S42) which notifies the client computer 4 of the confidential reception, and transmits (S45) the encrypted communication message to the client computer 4 via the LAN 5 as an electronic mail. Then, the process returns.

The transmitted electronic mail (S45) is stored temporarily in the mail box of the client computer 4. The mail box is inside the mail server 6.

When the mail-check command is input (FIG. 8 S60), the client computer 4 checks (S62) whether or not there is an electronic mail from the facsimile server 1 stored in the mail box in the mail server 6 and when the electronic mail from the facsimile server 1 is not stored (S64), the process returns.

The client computer 4 carries out mail check (S62), and when the electronic mail from the facsimile server 1 is stored and is sent (S64) to the client computer 4, the encrypting and decrypting common key is made (S66) by using the address of the facsimile server 1 on the LAN 5.

Next, the client computer 4 decrypts the received electronic mail by the made common key (S66) and displays (S68) the received electronic mail (S64).

The process of the client computer 4 returns when the electronic mail which is decrypted and displayed (S68) does not show the confidential reception (S70).

When the response content is input by the user (S72) with the received (S64) and decrypted electronic mail being displayed (S68) and the response content is encrypted (S74) by the made common key (S66), the client computer 4 transmits (S76) the encrypted response content as electronic mail to the facsimile server 1 via the LAN 5, and the process of the client computer 4 returns.

The transmitted (S76) electronic mail is temporarily stored in the mail box of the facsimile server 1. The mail box is inside the mail server 6.

When the prescribed period of time has elapsed (S84) with the received (S64) and decrypted electronic mail being displayed (S68) without the user's inputting of the response content, the process of the client computer 4 returns.

When the facsimile server 1 receives the electronic mail from client computer 4 (FIG. 7, S46) by periodically checking the electronic mail in the mail server 6, the facsimile server 1 makes the encrypting and decrypting common key (S48) by using own secret information, the center public information, and the address on the LAN 5 of the client computer 4 which is the sending side of the electronic mail.

Next, the facsimile server 1 decrypts (S50) the received electronic mail (S46) by the made common key (S48).

When the decrypted response content (S50) of the electronic mail shows the sending demand (S52) of the confidentially received image data (S40), the facsimile server 1 encrypts (S54) the confidentially received image data (S40) by the made common key (S48), and sends (S56) the encrypted image data to the client computer 4 as an attached file of the electronic mail.

The sent (S56) electronic mail is stored temporarily in the mail box of the client computer 4 inside the mail server 6.

The process of the facsimile server 1 returns when the decrypted response content (S50) of the electronic mail does not show the sending demand (S52) of the confidentially received image data (S40).

When the mail check command is input (FIG. 8, S60), the client computer 4 checks (S62) whether or not there is an electronic mail from the facsimile server 1 stored in the mail box in the mail server 6, and the process returns if the electronic mail from the facsimile server 1 is not stored (S64).

When the client computer 4 carries out mail check (S62) and the electronic mail transmitted from the facsimile server 1 is stored in the mail server 6 and is sent (S64) to the client computer 4, the client computer 4 produces the encrypting and decrypting common key (S66) by using the address of the facsimile server 1 on the LAN 5.

Next, the client computer 4 decrypts the received electronic mail by the made common key (S66) and displays (S68) the received electronic mail (S64). The process returns when the displayed content is an image data (S70).

The process may use the pass code as follows. When the client computer 4 demands sending, the pass code is input together and transmitted. The facsimile server 1 judges whether or not the pass code is correct. When the facsimile server recognizes the pass code is correct, the image data is transmitted to the client computer 4.

In the embodiment 2 described above, the facsimile server 1 notifies, by electronic mail, the destination computer which is supposed to carry out confidential processing that there is a confidentially received information by the facsimile server 1 which is temporarily stored in the facsimile server 1. The user who reads the electronic mail commands, box from his own computer, the information to be transmitted to his own mail. However, the facsimile server 1 is capable of setting up the confidentially received and temporarily stored information to be transmitted automatically by electronic mail, to be transmitted each time there is a confidential reception, to be transmit when several messages are stacked, or to send the information when the prescribed time has arrived.

Figure 9:
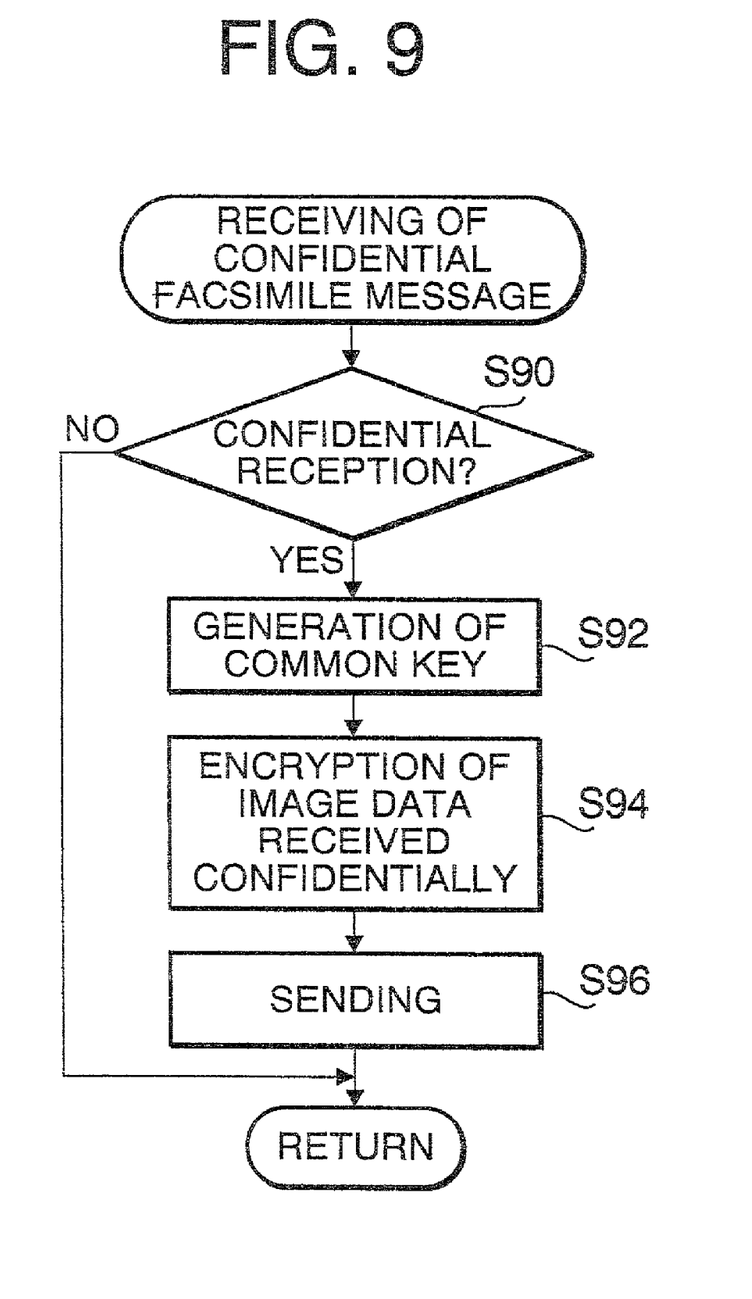
FIG. 9 is still another flow chart showing the operation of the facsimile apparatus 1 of FIG. 2.
Figure 10:
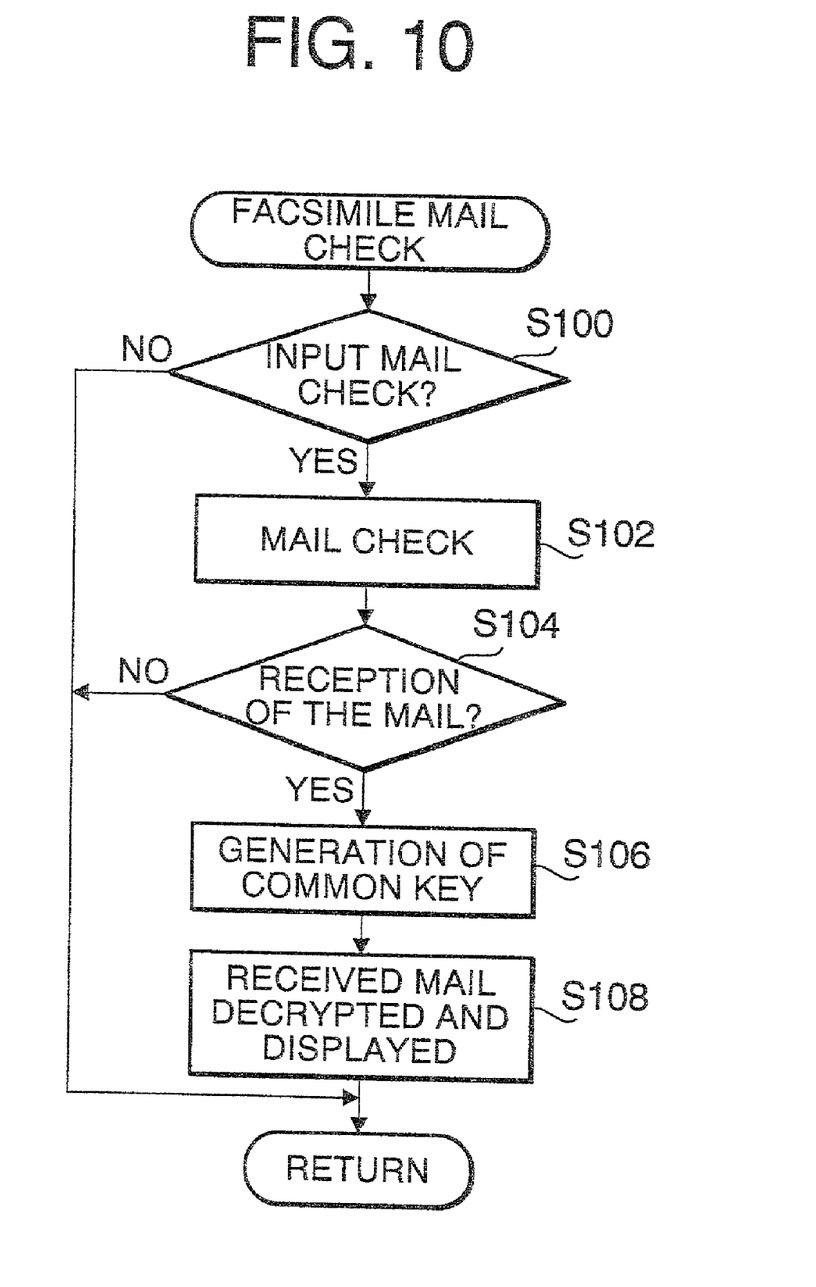
FIG. 10 is still another flow chart showing the operation of the client computer 4 shown in FIG. 6.

FIG. 9 is a flow chart showing the operation of the facsimile server 1 in which the facsimile server 1 transmits automatically the confidentially received information by electronic mail when there is a confidential reception. FIG. 10 is a flow chart showing the operation of the client computer 4 at this time.

When the facsimile server 1 confidentially receives (FIG. 9 S90) via PSTN from the facsimile device 2, the facsimile server 1 produces the encrypting and decrypting common key (S92) by using its own secret information, the center public information, and the address of the client computer 4 on the LAN 5 which is the destination of the confidential reception.

Next, the facsimile server 1 encrypts (S94), by the made common key (S92), the information (image data) (S90) received confidentially, and sends (S96) the encrypted image data as an attached file of the electronic mail to the client computer 4 via the LAN 5. Then the process returns.

The sent electronic mail (S96) is stored temporarily in the mail box of the client computer 4. The mail box is inside the mail server 6.

When the mail check command is input (FIG. 10, S100), the client computer 4 checks whether or not there is electronic mail transmitted from the facsimile server 1 stored in the mail box in the mail server 6 (S102). When the electronic mail transmitted from the facsimile server 1 is not stored (S104) in the mail box, the process of the client computer 4 returns.

When the client computer 4 carries out mail check (S102) and the electronic mail transmitted from the facsimile server 1 is stored in the main box and is sent (S104) to the client computer, the client computer 4 produces the encrypting and decrypting common key (S106) by using the address of the facsimile server 1 on the LAN 5.

Next, the client computer 4 decrypts the received electronic mail by the made common key (S106) and displays (S108) the received electronic mail (S104), and then the process returns.

According to the facsimile apparatus of the embodiments of the present invention, when transmitting the confidentially received information by the facsimile communication to the destination computer which is supposed to carry out confidential processing, the facsimile communication which is capable of protecting privacy can be realized. Since the preliminary exchange communication at the time of encrypted communication is not necessary, it is possible to save trouble.

According to the facsimile apparatus of the embodiments of the present invention, the level of privacy protection may be fixed in accordance with the level of privacy protection of the computer network and the content of the information which is received confidentially.

What is claimed is:

1. A facsimile apparatus for carrying out facsimile communication by an instruction from a computer, comprising:
   means for notifying a computer of confidential reception of content when the facsimile apparatus has performed the confidential reception, said computer being supposed to carry out confidential processing;
   means for receiving a demand from the computer to transmit the confidentially received content to the computer; and
   means for transmitting the confidentially received content in accordance with the demand from said computer,
   wherein the facsimile apparatus performs encryption and decryption by using an encryption key produced based on peculiar information of the facsimile apparatus and said computer at the time of carrying out communication with said computer via a network.

2. The facsimile apparatus according to claim 1, further including selecting means for selecting a part to be encrypted by the encryption key from the content to be transmitted to said computer which is supposed to carry out confidential processing, wherein the facsimile apparatus performs encryption in accordance with the selection of the selection means.

3. A facsimile apparatus for carrying out facsimile communication by an instruction from a computer, comprising:
   means for carrying out confidential reception of content;
   means for notifying the computer of the confidential reception;
   means for receiving a demand from the computer to transmit the confidentially received content to the computer; and
   means for transmitting the confidentially received content as electronic mail to the computer which is supposed to carry out confidential processing only after the demand is received,
   wherein the facsimile apparatus performs encryption and decryption by using an encryption key produced based on peculiar information of the facsimile apparatus and said computer at the time of carrying out communication with said computer via a network.

4. The facsimile apparatus according to claim 3, further including selecting means for selecting a part to be encrypted by the encryption key from the content to be transmitted to said computer which is supposed to carry out confidential processing, wherein the facsimile apparatus performs encryption in accordance with the selection of the selecting means.

5. A facsimile apparatus comprising:
   receiving means for receiving facsimile data from a channel, wherein said receiving means is capable of carrying out confidential reception of facsimile data, and when confidential facsimile data is received, the facsimile apparatus transmits to a designated forwarding destination a communication message to the effect that confidential reception of facsimile data has been carried out;
   encrypting means for encrypting the facsimile data by a common key produced based on peculiar information of the facsimile apparatus and the designated forwarding destination; and
   forwarding means for forwarding the encrypted facsimile data to the designated forwarding destination via a computer network, wherein when the facsimile apparatus receives from the designated forwarding destination, after transmitting the communication message, a demand for sending of the confidential facsimile data, the forwarding means forwards the confidential facsimile data to the forwarding destination.

6. The facsimile apparatus according to claim 5, wherein said channel is a telephone line.

7. The facsimile apparatus according to claim 5, wherein when the confidential reception of the facsimile data is carried out, the facsimile data is encrypted by said encrypting means.

8. The facsimile apparatus according to claim 5, wherein said forwarding means utilizes electronic mail protocol.

9. The facsimile apparatus according to claim 5, wherein the facsimile apparatus transmits the communication message as electronic mail to the designated forwarding destination.

10. The facsimile apparatus according to claim 9, wherein the facsimile apparatus encrypts the communication message by using said common key.

11. The facsimile apparatus according to claim 9, wherein the facsimile apparatus receives a pass code together with said demand from the designated forwarding destination, judges whether or not the pass code is correct, and forwards the confidentially received facsimile data to the forwarding destination when the pass code is correct.

12. The facsimile apparatus according to claim 5, further including producing means for producing said common key based on peculiar information of the facsimile apparatus and the designated forwarding destination.

13. The facsimile apparatus according to claim 5, further including selecting means for selecting a part to be encrypted by said common key from the received facsimile data, wherein the facsimile apparatus encrypts the facsimile data in accordance with the selection of the selecting means.

14. A method of facsimile communication comprising the steps of:
   receiving confidential facsimile data from a channel;
   producing a common key based on peculiar information of a receiving side and a designated forwarding destination;
   notifying the designated forwarding destination that the confidential facsimile data has been received;
   encrypting the confidential facsimile data by said common key; and
   forwarding the encrypted confidential facsimile data to the designated forwarding destination from the receiving side via a computer network, wherein the encrypted confidential facsimile data is sent to the designated forwarding destination only after, in response to the notification, a demand to forward the confidential facsimile data was received from the designated forwarding destination.

15. A method according to claim 14, wherein said channel is a telephone line.

16. A method according to claim 14, further including the step of selecting a part to be encrypted by said common key from the received facsimile data, wherein encryption of the facsimile data is carried out in accordance with the selection.

17. The method according to claim 14, wherein said common key is produced by a ID-NIKS system.

18. A computer readable storage medium for storing a program to be executed by a computer, comprising:

program code means for making a computer receive confidential facsimile data from a channel;

program code means for making the computer produce a common key based on peculiar information of a receiving side of the facsimile data and a designated forwarding destination;

program code means for making the computer notify the designated forwarding destination that the confidential facsimile has been received;

program code means for making the computer encrypt said confidential facsimile data by said common key; and program code means for making the computer forward the encrypted confidential facsimile data to the designated forwarding destination from the receiving side via a computer network, wherein the encrypted confidential facsimile data is sent to the designated forwarding destination only after, in response to the notification, a demand to forward the confidential facsimile data was received from the designated forwarding destination.

19. The computer readable storage medium according to claim 18, wherein said channel is a telephone line.

* * * * *